United States Patent [19]

Widrow

[11] Patent Number: 4,556,962

[45] Date of Patent: Dec. 3, 1985

[54] SEISMIC EXPLORATION METHOD AND APPARATUS FOR CANCELLING INTERFERENCE FROM SEISMIC VIBRATION SOURCE

[76] Inventor: Bernard Widrow, 860 Lathrop Dr., Stanford, Calif. 94305

[21] Appl. No.: 487,304

[22] Filed: Apr. 21, 1983

Related U.S. Application Data

[63] Continuation of Ser. No. 289,309, Aug. 3, 1981, abandoned, and a continuation of Ser. No. 68,017, Aug. 20, 1974, abandoned.

[51] Int. Cl.$^4$ ............................................. G01V 1/36
[52] U.S. Cl. ........................................ 367/45; 367/41; 73/628
[58] Field of Search ................ 367/21, 22, 41, 45, 367/46, 47, 50, 51, 58, 63; 364/421; 73/614–616, 628

[56] References Cited

U.S. PATENT DOCUMENTS

| | | | |
|---|---|---|---|
| 2,087,702 | 7/1937 | Peters | 367/58 |
| 2,275,735 | 3/1942 | Cloud | 367/51 |
| 2,982,371 | 5/1961 | Woods et al. | 367/45 |
| 3,221,297 | 11/1965 | Smith et al. | 367/41 |
| 3,266,012 | 8/1966 | Prichett et al. | 367/41 |
| 3,281,773 | 10/1966 | Newman | 367/41 |
| 3,421,141 | 1/1969 | Meyerhoff | 367/45 |
| 3,680,040 | 7/1972 | Silverman | 367/41 |
| 3,866,161 | 2/1975 | Barr et al. | 367/21 |
| 3,979,713 | 9/1976 | Parrock | 367/21 |
| 4,223,399 | 9/1980 | Hockett | 367/46 |

OTHER PUBLICATIONS

Widrow et al., "Adaptive Noise Cancelling . . . Applications", 1975, Proc. IEEE, vol. 63, #12, pp. 1692–1716.
Widrow et al., "Stationary and . . . Adaptive Filter", 8/76, pp. 1151–1162, Proc. IEEE, vol. 64, #8.
Goupillaud, "An Approach . . . Seismic Records", pp. 754–760, Geophys., vol. 26, #6, 12/61.
Rice, "Inverse Convolution Filters", 2/62, pp. 4–18, Geophys., vol. 28, #1.

Primary Examiner—Nelson Moskowitz
Attorney, Agent, or Firm—Flehr, Hohbach, Test, Albritton & Herbert

[57] ABSTRACT

Seismic exploration method and apparatus in which interference signals received by the sensing geophones from the seismic vibration source are cancelled by employing a signal representative of the seismic vibration source and combining it with the output from the sensing geophones.

2 Claims, 5 Drawing Figures

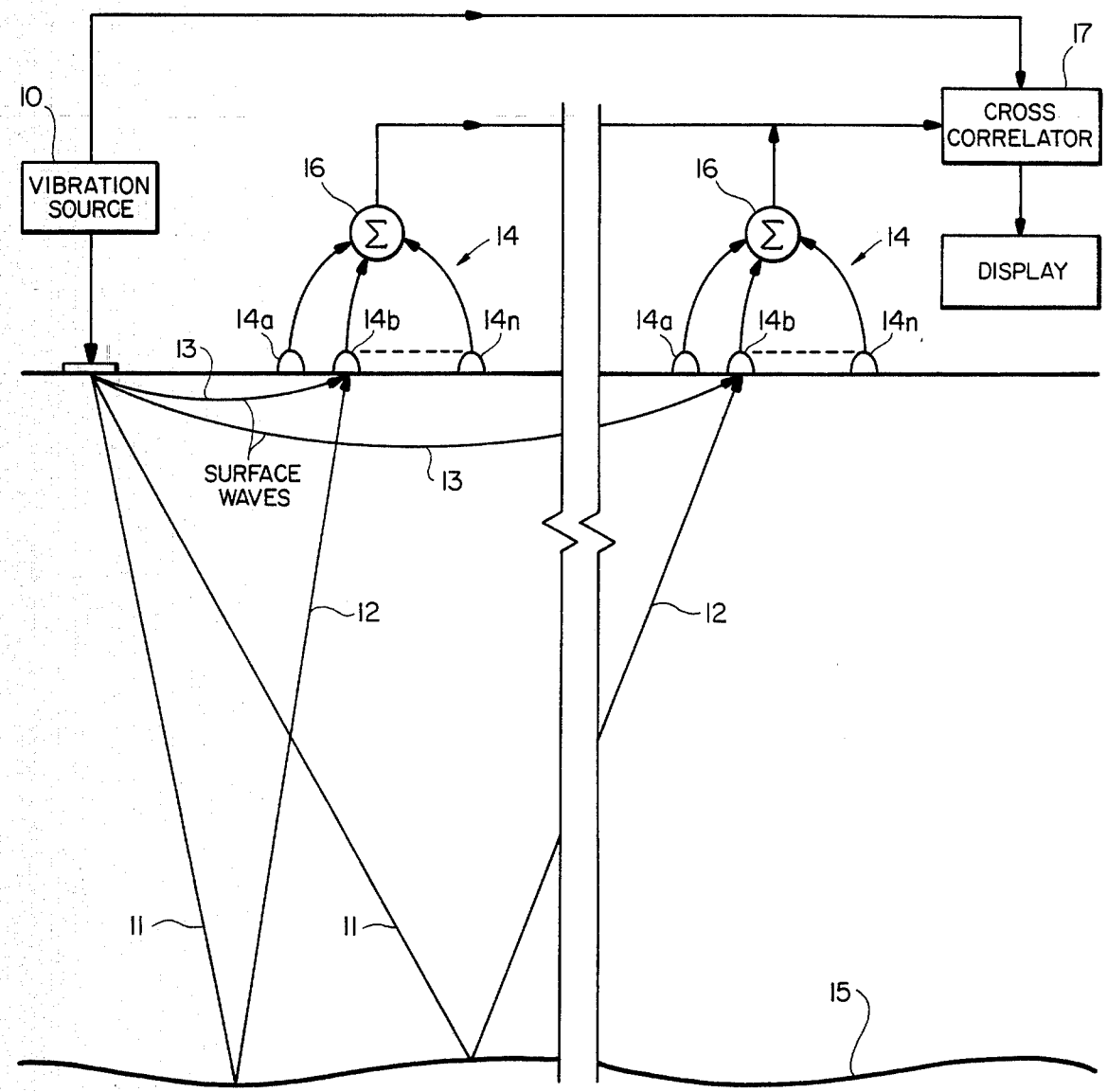
FIG_1
*(PRIOR ART)*

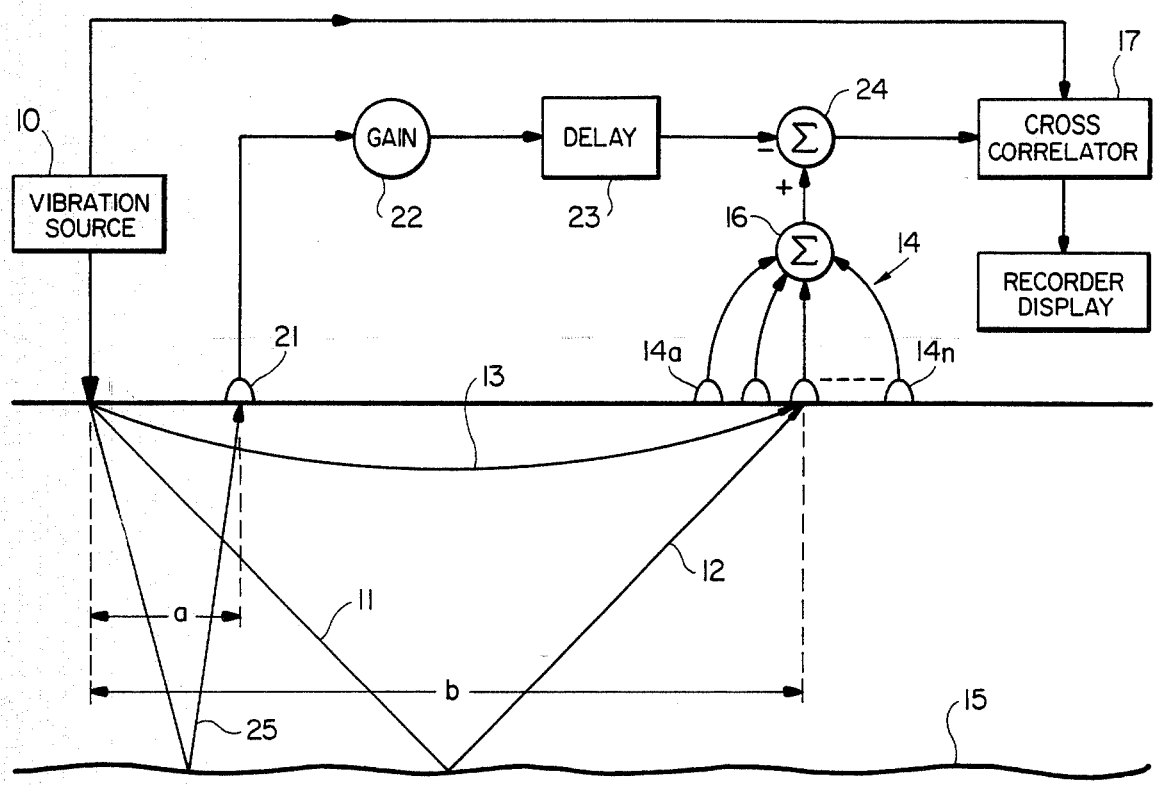
FIG_2
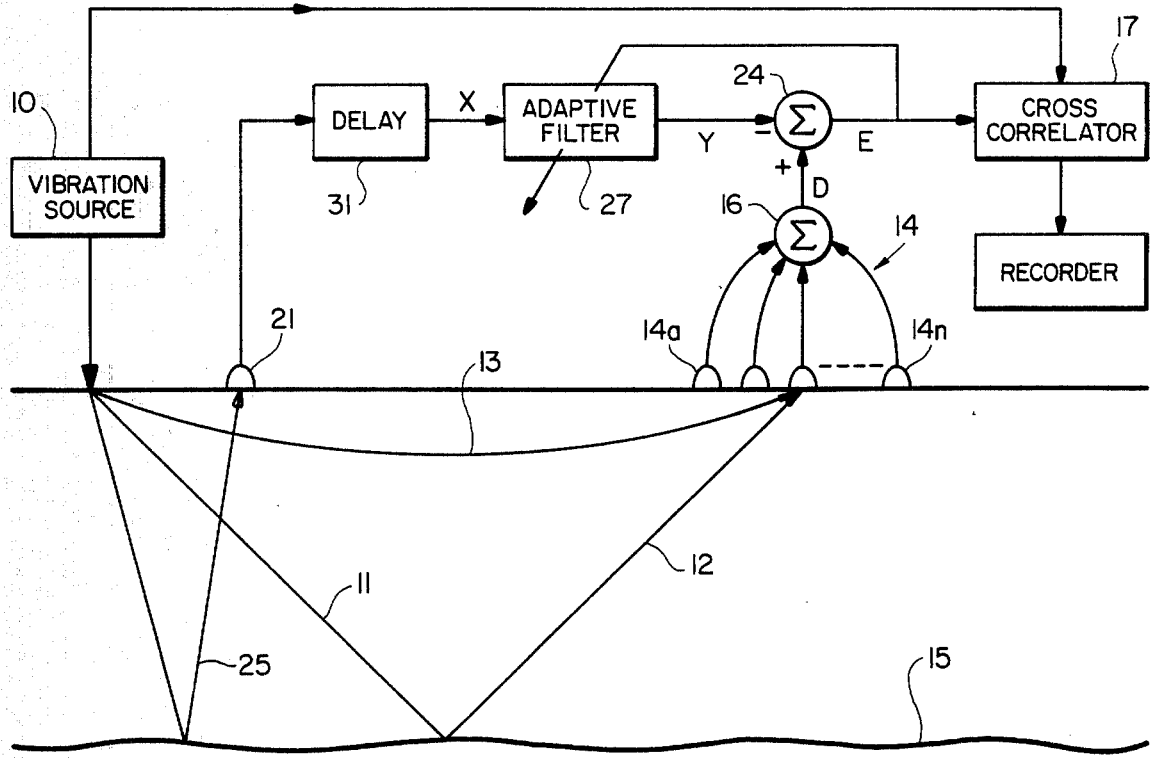
FIG_3

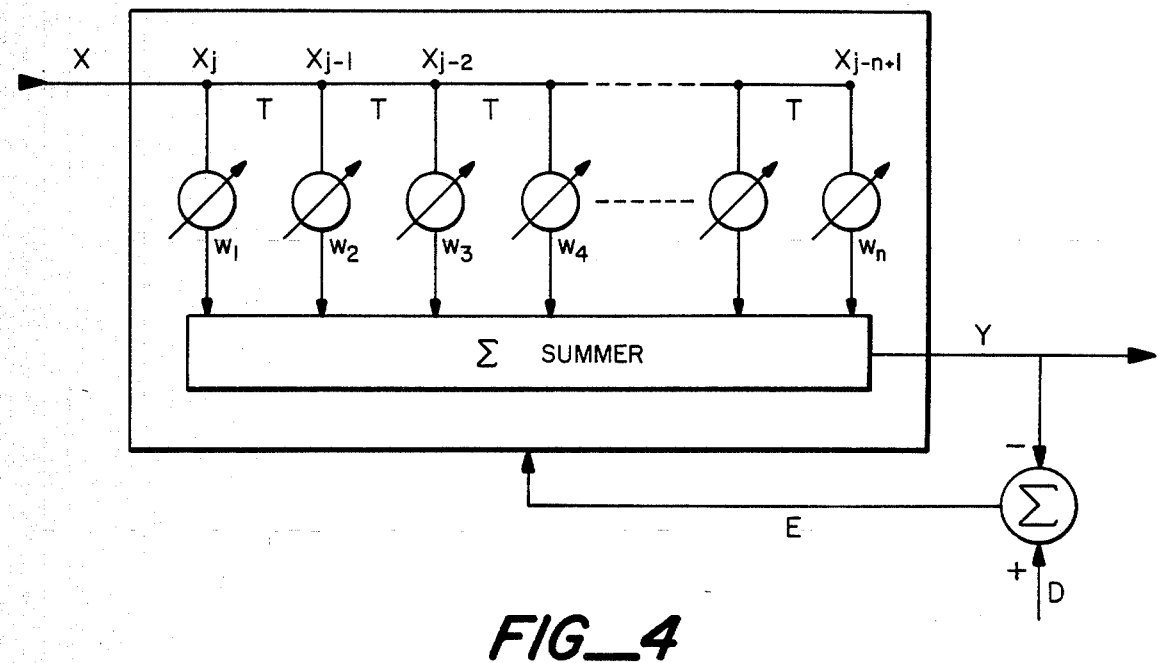
FIG_4
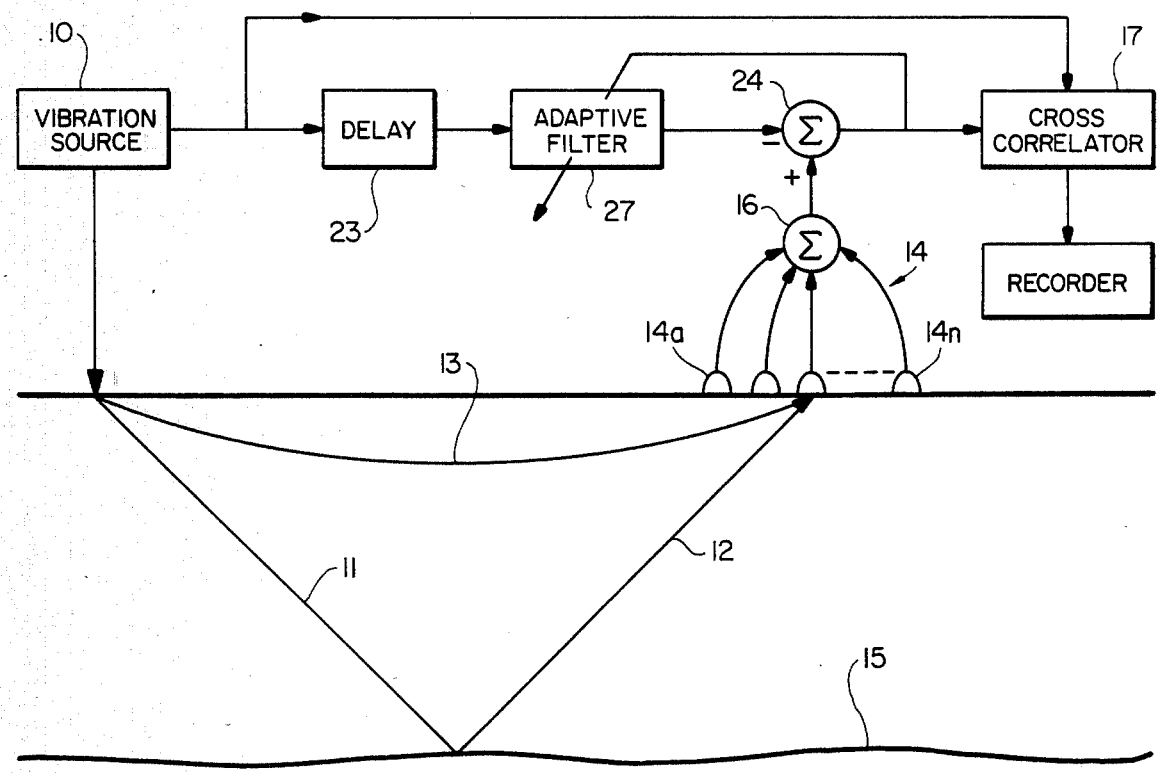
FIG_5

SEISMIC EXPLORATION METHOD AND APPARATUS FOR CANCELLING INTERFERENCE FROM SEISMIC VIBRATION SOURCE

This is a continuation of application Ser. No. 289,309 filed Aug. 3, 1981, now abandoned, a continuation of application Ser. No. 68,017, filed Aug. 20, 1974, now abandoned.

In seismic exploration as currently practiced, each pulse of sonic vibration is generally applied over a finite duration and has a predetermined frequency sequence. FIG. 1 schematically shows the prior art apparatus. The applied vibration not only penetrates the earth as shown by the lines 11, so that reflections 12 from deep layers can be detected by geophones at the surface and related to the geologic layering within the earth, but also causes an elastic surface wave 13 that radiates in a shallow layer in all directions. Geophones positioned on the earth's surface which are intended to receive waves from deep reflecting layers also receive the surface waves. The reflected waves are the ones of interest, the surface waves provide interference.

The surface waves have much higher amplitude, often in the order of 1000 times or more, and since their arrival could occur simultaneously with that of the desired reflected waves, they present a formaidable source of interference.

At present, two methods are used to limit the interference from the surface waves. First, the geophones 14 are generally not used singularly but are connected together in sub-arrays 14 as indicated by the reference numerals 14a, 14b . . . 14n. The geophone outputs in each sub-array are added or averaged by connecting the geophones in series and parallel combinations or completely in parallel or completely in series. They are deployed on the surface of the earth over a distance of one or more wavelengths of the surface waves. For example, if the applied vibrations are of a frequency modulated sinusoidal wave of finite duration sweeping, for example, in frequency from 10 Hz to 75 Hz, the longest wavelength would occur at 10 Hz. If the speed of propagation of the surface wave is between 1000 and 2000 feet per second, then the 10 Hz wavelength would be between 100 and 200 feet. If the subarray is spread so that its elements extend over 300 feet or more on a radial line from the vibration source, substantial cancelling of the surface waves will take place as the subarray geophone signals are added to one another, as performed by the adder 16. In practice, the number of geophones typically ranges between 10 and 100 for a single sub-array.

This arrangement causes cancellation of surface waves but not of waves arriving from deep reflecting layers. The reflected waves arrive at the surface at angles close to vertical and since their average propagation speed is much higher than for surface waves, say 15,000 feet per second, the difference in arrival time among the sub-array geophones is negligible and cancellation of deep arriving waves does not take place. Thus, use of the sub-array enhances the ratio of reflected wave signals to direct surface wave signals over that which would be obtained with just a single geophone.

The second method uses matched filtering not only to cut down on random noise received from within the earth, but also to cut down the vibrations received via the surface wave from the source of vibrations. The known transmitted waveform taken from the source of vibration is cross-correlated in the cross-correlator 17 with the signal output of the geophone sub-array. The time lag between the known transmitted waveform and the received geophone sub-array signal is set in the cross-correlator to correspond to the two-way travel time from surface down to the target reflector zone and then back to the surface. In the absence of surface waves, the cross-correlation corresponds to the amplitude of the reflected wave from the target depth. Random noise from the earth tends to be eliminated because it does not correlate with the transmitted waveform. Also, reflected energy from depths other than the target depth do not correlate with the transmitted waveform when it is time lagged for the selected target depth. However, some correlation which is non-zero will result from the surface waves which will severely interfere with the correlation of the reflected wave with the transmitted wave. This would not be a problem except for the fact that the surface wave is so strong.

The two described methods of interference reduction are in wide use and are highly effective. They are representative of the current state of the art in seismic exploration. Although they are very effective, the severe interference by the surface waves which may be in the order of 1000 times stronger than the desired signal often causes a significant amount of interference to appear at the correlator output. The concept of cross-correlation is not new, having been practiced in the fields of radar and sonar since the early 1950's.

It is a general object of the present invention to provide an improved method and apparatus for reducing the interference of surface waves with waves reflected by layers within the earth.

It is a further object of the present invention to provide an apparatus and method in which a reference signal directly related to the seismic source pulse is combined with the output of the geophones to further reduce the surface wave interference.

It is a further object of the present invention to provide an apparatus and method in which a reference signal directly related to the seismic source pulses is combined with the output from the geophones in an adaptive filter.

The foregoing and other objects of the invention are achieved by a method and apparatus for surface exploration. The apparatus includes means for applying seismic pulses at the earth's surface and a plurality of geophones spaced from the source of seismic pulses to detect seismic waves reflected from within the earth and provide earth signals. Said geophones also serving to detect unwanted surface seismic waves and provide surface wave signals. The apparatus includes means for providing a reference signal directly related to the source seismic pulses and means for processing said pulse by controlling its amplitude and phase in a predetermined manner. Means are provided for combining the processed reference pulse and the output earth and surface signals from the geophones to provide output signals representative of the earth signals. The process includes the steps of deriving reference signals and combining them in a predetermined manner with the output from the sensing geophones to eliminate surface wave interference.

The invention will be more clearly understood from the drawings and description to follow.

FIG. 1 is a schematic view of a seismic exploration apparatus in accordance with the prior art.

FIG. 2 is a schematic diagram of apparatus in accordance with one embodiment of the invention.

FIG. 3 is a schematic diagram of apparatus in accordance with the preferred embodiment of the present invention.

FIG. 4 is a schematic diagram of the adaptive filter shown in FIG. 3.

FIG. 5 is a schematic diagram of still another apparatus in accordance with the invention.

The first embodiment of the invention will be described in connection with FIG. 2. The same reference numerals, as used in connection with FIG. 1, have been applied to like parts and waves. The seismic vibration source 10 causes elastic earth waves designated by the numeral 11 to penetrate the earth and reflect from the interface 15. The reflected waves 12 are sensed by geophones 14. As previously described, surface waves 13 are also coupled to the geophones and cause interference. In accordance with the prior art, the interference was minimized by the use of arrays of spaced geophones and by cross-correlation.

In accordance with the present embodiment of the invention, there is provided a monitoring geophone 21 closely adjacent to the source which serves to receive the interfering surface waves 30 and provide an output reference signal. The signal is applied to means 22 for varying the gain of the signal and to delay means 23. The output from the delay means is applied to a second adder 24 which combines the processed reference signal with the output from the adder 16. The combined output signal is then applied to cross-correlator 17. The monitoring geophone is placed a short distance a from the vibration source, much closer to the vibration source than the receiving geophones at the distance b; that is, distance b is much greater than distance a. Making a small causes the surface wave component of the monitoring geophone output to be larger in amplitude and to occur earlier in time than the surface wave components of the receiving geophones. The importance of this will be explained below.

The monitoring geophone 21 can be a single geophone or a geophone array located close to the source of vibration. The receiving geophone array 14 can be an active array of the type previously described and shown in the figure or could be a single geophone.

The present invention is predicated upon choosing the gain g and the delay $\Delta$ such that the interference signal picked up by the monitoring geophone is properly scaled and delayed so that it can be subtracted from the geophone sub-array output in order to achieve cancellation of the interference component caused by surface waves from the vibration source.

The choice of g and $\Delta$ is determined in the following manner: Because of energy spreading, the power intensity of the surface wave will drop off approximately by the inverse square law and, therefore, the signal amplitude of this wave will drop off in proportion to distance. Assuming that $\Delta$ is properly chosen, balancing of the reference signal with the surface wave signal amplitude requires that $$g = (a/b)$$

where g is the gain of the amplifier 22. For example, if a is 100 feet and b is 2500 feet, then the gain will be 1/25, that is, the output of the monitoring geophone must be attenuated.

Neglecting the curvature of the wave paths and any possible dispersion in multi-path, the distance to the monitoring phone traveled by the surface wave is assumed to be a and that to the center of the receiving sub-array is assumed to be b. If the speed of propagation of the surface wave is assumed to be c, then the surface travel time from the vibration source to the monitoring geophone is a/c while that to the center of the receiving sub-array is b/c. Therefore, to balance the timing of the two surface wave signals for proper subtraction and canceling, the delay $\Delta$ should be set to be the difference in time delays.

$$\Delta = (b-a)/c$$

For the above example, a=100 feet; b=2500 feet; $\Delta$=2400/C. If c is known, for example, to be 1000 ft/sec, then $\Delta$=2400/1000=2.4 sec.

Making a smaller than b causes the interference picked up by the monitoring phone to precede that of the receiving array. Under these circumstances, timing balance is easily achieved by delaying the reference phone signal. Delay devices are physically realizable, whereas predictive devices are not realizable.

One other issue is of importance, that of possible signal cancellation. The same process shown above for interference cancellation will cause some signal cancellation. Referring to the above figure, the possibility of the monitor phone receiving reflected signals from the target reflector is illustrated by the wave 25. Such signals would be weighed by g and delayed by $\Delta$ and their combination with the reflected signals from the receiving sub-array would comprise an interference. As long as g is small, however, interference will be negligible. a and b can be readily chosen to make g small. For the above example, the amplitude of this form of interference is 1/25 of the desired signal. The interference signal will thus be 28 db below that of the desired signal, totally negligible with a small gain g. Referring again to the above figure, it should be noted that the output after surface wave cancellation is fed to the cross-correlator 17 in accordance with conventional practice.

Illustrated here is a second reason for making a small. Small a results in small g which, in turn, results in only a small amount of interference due to signal cancelling.

The delay times involved in the two surface wave paths, that is, between the vibration source and the monitoring geophone and between the vibration source and the receiving geophone array, may not be perfectly known. The speed of propagation is not known accurately and may be highly variable from place to place requiring readjustment for each location. Furthermore, the signal intensity of the surface waves may fall off in some manner other than an inverse square and may not be precisely predictable from location to location, again requiring adjustment and realignment of the equipment for each location. Finally, the surface waves may exhibit multi-path propagation providing several input signals to the geophones some of which may not be accurately cancelled by the delay and gain control. In fact, with a sub-array of geophones there are as many paths as there are geophones, each with a different delay time. When the vibration source is actually comprised of several individual synchronized sources, the number of paths is at least the number of vibration sources multiplied by the number of geophones in the receiving array. In practice, multiple vibration sources spaced from one another are generally used. The values of g and $\Delta$ are a compromise of all the above factors that would provide an improved performance over the present practice. More accurate cancelling of the surface wave interference can be accomplished by using adaptive filtering in accordance with the preferred embodiment of the invention, shown in FIG. 3 where like reference numbers have been applied to like parts and waves. The adaptive filter 27 is more completely described in the article entitled "Adaptive Noise Cancelling: Principles and Applications", by Widrow et al, "Proceedings of IEEE", Vol. 63, No. 12, December 1975, pages 1692-1716. The adaptive filter contains many delays and gains (weights, or coefficients) and is thus a generalized form of the single delay and gain. It allows the possibility of balancing the multiple surface wave signals for more perfect cancellation, especially valuable when the surface wave paths are truly multi-path each with its own delay and its own gain. If there is no multi-path involved, the adaptive filter would self-adjust in accordance with the teaching in the above article and would converge to the equivalent of a single delay and a single weight as in FIG. 2.

Referring to FIG. 4, a schematic representation of one type of adaptive filter is shown. Delay units T seconds long are labeled as such in the above diagram. The gains or weights are variable coefficients and are labeled $w_1, w_2, \ldots w_n$. The output is a weighted sum of the delayed versions of the input. The adaptive filter contains an automatic algorithm for the adjustment of the weights to cause the output at point Y to match the desired response input at point D as best possible in the least square sense. One algorithm for adjusting the weights that is most commonly used is that of Widrow and Hoff, "Adaptive Switching Circuits", IRE Wescon Convention Record, Part 4, pages 96-104, 1960. It minimizes mean square error and is based upon the methods of steepest descent to achieve optimumization. This algorithm is $$W_{j+1} = W_j + 2\mu e_j X_j,$$

where the error $e_j$ is $$e_j = d_j - X_j W_j.$$

In the above algorithm, $W_j$ is the present weight vector $$W_j = \begin{Bmatrix} W_{ij} \\ W_{2j} \\ \vdots \\ W_{nj} \end{Bmatrix},$$

$X_j$ is the present input signal vector whose components are the present and delayed input data samples $$X_j = \begin{Bmatrix} X_j \\ X_{j-1} \\ \vdots \\ X_{j-n} \end{Bmatrix},$$

and the output is $$Y_i = \sum_{k=1}^{n} X_{j-k+1} W_{kj} = X_j^T W_j.$$

All this is in accord with the 1975 Widrow et al Proceedings of IEEE paper. In this paper it is shown that when such an adaptive filter is connected into a noise canceller as shown in FIG. 3, that adapting the filter to minimize mean square error, i.e., to minimize the output power to the canceller causes this output E to consist of the signal at point D with all components correlated with components at the input X removed by subtraction. When converged, the adaptive filter is stabilized and it becomes essentially a linear filter. Any linear filter chosen to minimize mean square error is a Wiener type filter. It is well known and it is demonstrated in Widrow et al that the error of a Wiener filter is uncorrelated with the Wiener filter input. The implication in the case of the adaptive cancelling system of FIG. 3 is that the output at point E will be uncorrelated with the adaptive filter input at point X. Since the signal at point X is obtained from the monitoring geophone and since the geophone is placed very close to the source of vibration, its contents are overwhelmingly dominated by the surface wave interference and any possible reflected earth wave would be negligible by comparison. The conclusion is that since the calcelled output at point E is uncorrelated with the surface wave signal, then the surface wave interference must have been removed from the receiving geophone sub-array whose output is at the point D. The cancelled output at point E, therefore, contains the desired reflected earth wave signal without interference arriving directly from surface waves from the vibration source. It is apparent that other types of filters, such as adaptive lattice filters, responsive to the error signal to minimize error may be used.

In FIG. 3 there is shown the delay means 31. For the moment, let this delay be set to zero. Suppose there is no multi-path with the surface wave propagation paths. The adaptive filter impulse response will converge to a simple configuration. All the weights will go to zero except the one whose input is tapped Δ seconds along the delay line and this weight will take the value of gain g. The surface wave willb be perfectly cancelled. This is the equivalent of the circuit shown in FIG. 2.

Now suppose there is multi-path for the surface waves. Several of the weights will take non-zero values as a result of the adaptive process, most likely clustered about the weight that formerly had the value g. The first several weights of the filter will have the value zero. Accordingly, these weights can be set to zero a priori by placing the permanent delay $\Delta_1$ in front of the adaptive filter. Being conservative, the delay $\Delta_1$, should be set as discussed above with respect to FIG. 2, only it should be no larger than the difference between the shortest delay from the vibration source to the receiving geophone sub-array and the longest delay between the vibration source and the monitoring geophone. If such information is unavailable, the delay $\Delta_1$ can be omitted. More delays, taps and adaptive weights should then be included in the adaptive filter.

The total memory span of the adaptive filter is defined as $$\Delta_2 \stackrel{\Delta}{=} (n-1)T,$$

where n is the number of weights and T is the time spacing between delay line taps. This memory span is to be chosen conservatively so that the shortest surface path delay from the vibration source to the monitoring geophone plus the delay $\Delta_1$ plus the delay span $\Delta_2$ is equal to the longest path delay from the vibration source to the receiving geophone sub-array. The number of weights n is to be chosen to be at least as big as the total number of paths from the seismic source or sources to the receiving sub-array. The time delay T, the tap spacing delay of the adaptive filter, can be determined once n and $\Delta_2$ are chosen, in accordance with the above equation. The reciprocal of T is the sampling frequency for the adaptive cancelling system when implemented by digital means.

It is important that the adaptive filter be structured as shown in FIG. 4, with a finite memory span. This span $\Delta_2$ must be carefully chosen. If it is made too long, the reflections from shallow depths would be cancelled just like surface waves since their signal characteristics are quite similar. Thus, the most shallow target zone detectible is one whose travel time from seismic source to target then up to the receiving geophone exceeds the sum of the maximum delay from the seismic source to the monitoring geophone plus the delay $\Delta_1$ plus memory span $\Delta_2$.

FIG. 5 shows another embodiment of the invention, with like reference numerals, in which the reference signal applied to the adaptive filter is derived directly from the vibration source rather than from a monitoring geophone. The reference signal could be obtained from the signal generator driving the vibration source or from an accelerometer placed on the vibration source. When using such a direct system, variations in coupling between the vibration source and the earth are not taken into account in the reference input. If this coupling is variable from one vibrational sequence to the next, imperfect surface wave cancelling will result with a real-time adaptive rocedure described below but would cause no difficulty with non real-time processing with recorded data, explained below. With the configuration of FIG. 5, there are advantages. The signal input to the adaptive filter comes from a signal generator and is thus noise-free. If it came, as in the previous configurations, from a monitoring geophone it would contain some earth noise and some reflected signal. Absence of reflected signal components is advantageous. There will be no signal cancelling. In this configuration the delays $\Delta_1$ and $\Delta_2$ are chosen as before. It should be noted that the delay from vibration source to monitoring signal (the seismic waveform itself) is zero in this system.

An issue of importance for both of the above adaptive approaches is that of data requirements for properly training the adaptive filter. How much data is required to train the adaptive filter and how should the input data be used for most efficient training? A general analysis of data requirements for the training of adaptive filters has been developed by Widrow et al, "Stationary and Non-stationary Learning Characteristics of the LMS Adaptive Filter", Proceedings of the IEEE, Vol. 64, No. 8, August 1976, pp. 1151-1162. In this paper, it is shown that if the number of training samples is equal to ten times the number n of adaptive weights, then the error power will be 10% greater than the ideal minimum error power. The ideal can only be achieved with an infinite amount of training data, in principle. Thus, when training with ten times as many training samples as there are weights, the error power (or mean square error) will be 0.83 db greater than the minimum error power. This is considered to be a reasonable and satisfactory error power level, not far from ideal.

A typical vibration source waveform will be a frequency modulated sinusoid, perhaps varying from 10 Hz and swept uniformly over time to 50 Hz. The duration of a typical sweep might be 15 seconds. During the time, the waveform undergoes 450 cycles, and at the Nyquist rate of two samples per cycle, approximately 900 independent samples could be taken. Therefore, over the duration of a single FM source pulse, enough independent samples could be taken to train a 90 weight adaptive filter. This is quite a large filter. A filter of 10 to 20 weight would probably suffice in the present application. In any event, a filter of 90 or less weights could be adequately trained with the data from a single FM swept pulse.

There are two ways to achieve adaptive or learning behavior for the filter weights. If the system is configured as in FIG. 3, the adaptive filter would be available out in the field where the seismographic crew is gathering the data. The vibration sources would remain in place and during the first FM swept pulse, the adaptive filter would be trained in real time. Fixing the weights by stopping the adaptive algorithm, another FM sweep is then launched and processed by the adaptive cancelling system. Although this method would require two FM sweeps to do the job formerly done by one, on the second sweep and useful output data would be obtained with the strong surface wave cancelled. This would greatly reduce the dynamic range requirements for the cross-correlation and recording system and would allow the geophone amplifiers to operate at a higher gain and lower noise level. The same would be true for any tape recording apparatus that may be storing the data at various points in the system. The result would be a much sharper, clearer and less noisy output signal. The second way that adaptivity can be achieved would be to record data at points X and D of the system of FIG. 3 or FIG. 4. The adaptive processing would be accomplished in a laboratory away from the field after the data recording session. The adaptive filter could be implemented with computer software rather than with adaptive hardware of the type that one would use in the field. For a given FM sweep, the adaptive filter would be totally adapted since the amount of data from a single sweep would be sufficient. Then the same data would be repeated and played through the converged non-adapting filter to cancel the surface wave effects. Following this procedure, only the same amount of data would be required as is now used in the conventional process. This approach has the advantage of requiring less equipment out in the field and half as many FM sweeps from the fibration source, but would not give the benefits of reduction of dynamic range that would come from real time adaptive cancellation of the surface wave effects at the recording site.

What is claimed is:

1. A method of seismic exploration comprising the steps of
    generating and applying seismic wave to the surface of the earth, said waves traveling into the earth and reflecting from formations in the earth and also traveling along the surface of the earth,
    placing at least one receiving seismic detector on the surface of the earth spaced on the surface of the earth from the point of application of said waves to receive reflected seismic wave and unwanted surface waves and generate signals corresponding thereto, generating a monitoring or reference signal representative of the applied seismic waves, delaying said reference signal by an amount $\Delta_1$, adaptively processing said delayed reference signal to introduce a memory span delay equal to $\Delta_2$ whereby the time delay between the generated seismic waves and the processed delayed reference signal is equal to the time required for a surface seismic wave to travel from the source of applied seismic waves to the at least one receiving detector, and combining the processed reference signal with the output signals from the at least one seismic detector, the processing of said reference signal being such that the processed signal subtracts the surface wave signal and shallow reflected wave signals from the detector signals to provide an output signal representative of the seismic waves reflected from deeper formations.

2. Apparatus for seismic exploration comprising:

means for generating seismic waves at a first location on the earth's surface, at least one receiving geophone or an array of receiving geophones spaced from said first location for receiving seismic wave reflected from formations within the earth, said at least one receiving geophone or array also receiving seismic waves directly from the source along the surface and from shallow formations, said at least one geophone or array providing output signals representative of all of such received seismic waves, means for providing a monitoring or reference signal representative of said generated seismic waves, an adaptive filter having a limited impulse response duration corresponding to the transit time of surface waves from the seismic source to the receiving geophone or geophones connected to receive and process said reference signal, a delay means for receiving and delaying said reference signal an amount $\Delta_1$, said delay being no longer than the difference in travel times from the seismic source to the receiving geophone or array and from the seismic source to the reference sensor, an adaptive filter having a memory span $\Delta_2$, connected to receive and process said delayed reference signal, said delay means and adaptive filter having a total delay $\Delta_1+\Delta_2$ which when added to the delay of seismic waves from the seismic wave generating means to the means providing the reference signal is equal to the travel time of unwanted surface seismic waves from the source of the receiving geophone or array, combining means for subtracting the output of said adaptive filter from that of said receiving geophones, said adaptive filter including means for controlling the amplitude and delay of said reference signal so that when its output is combined with the receiving geophone output signal it cancels corresponding signals substantially entirely from the receiving geophone signal leaving substantially only signals of later arrival seismic waves reflected from the shallow and deeper formations.

* * * * *